US012344029B2

(12) United States Patent
Candy

(10) Patent No.: US 12,344,029 B2
(45) Date of Patent: Jul. 1, 2025

(54) PAINT PALETTE AND MOUNTING SYSTEM FOR SAME

(71) Applicant: Lintner Art Gear Limited, Cambridge (GB)

(72) Inventor: Philip Neil Candy, Cambridge (GB)

(73) Assignee: Lintner Art Gear Limited (GB)

( * ) Notice: Subject to any disclaimer, the term of this patent is extended or adjusted under 35 U.S.C. 154(b) by 3 days.

(21) Appl. No.: 18/260,665

(22) PCT Filed: Jan. 20, 2022

(86) PCT No.: PCT/GB2022/050152
§ 371 (c)(1),
(2) Date: Jul. 7, 2023

(87) PCT Pub. No.: WO2022/157494
PCT Pub. Date: Jul. 28, 2022

(65) Prior Publication Data

US 2024/0059095 A1 Feb. 22, 2024

(30) Foreign Application Priority Data

Jan. 25, 2021 (GB) ................................. 202100959

(51) Int. Cl.
*B44D 3/02* (2006.01)
*B44D 3/04* (2006.01)

(52) U.S. Cl.
CPC .................................... *B44D 3/02* (2013.01); *B44D 3/04* (2013.01)

(58) Field of Classification Search
CPC ............... B44D 3/02; B44D 3/04; B44D 3/18
USPC .......................................................... 206/1.7
See application file for complete search history.

(56) References Cited

U.S. PATENT DOCUMENTS

| | | | | |
|---|---|---|---|---|
| 5,351,812 A * | 10/1994 | Eagon | ...................... | B44D 3/04 220/230 |
| 6,325,206 B1 | 12/2001 | Stonex | | |
| 2014/0284225 A1 | 9/2014 | Davis | | |
| 2018/0264876 A1 | 9/2018 | Davis | | |

FOREIGN PATENT DOCUMENTS

| | | |
|---|---|---|
| CN | 210234535 U | 4/2020 |
| CN | 212073525 U | 12/2020 |

OTHER PUBLICATIONS

GB2100959.2 Search Report, Jul. 20, 2021, 9 pages.
Search Report for PCT/GB2022/050152, Jul. 4, 2022, 5 pages.

* cited by examiner

*Primary Examiner* — Bryon P Gehman
(74) *Attorney, Agent, or Firm* — Endurance Law Group PLC

(57) ABSTRACT

A paint palette mounting system comprising a docking portion (31) and a paint box (10), configurable to a paint palette. The system includes a first half (32) of a coupling feature at the docking portion for coupling with a second half (14) of the coupling feature located on the paint box/palette. The coupling feature is preferably comprised of complimentary stadium-shaped parts, with chamfered edges (37), that are separable by a twisting motion. The parts are held together by magnetic connections and/or a mechanical fixing element. The paint box/palette includes several overlapping lids (11, 18, 19) that unfold to provide paint mixing surfaces (17).

17 Claims, 7 Drawing Sheets

PAINT PALETTE AND MOUNTING SYSTEM FOR SAME

TECHNICAL FIELD

The present invention relates to a paint palette, in the form of a paint box with foldable lid panels, and a mounting system for same. Particularly, the invention is concerned with providing an "all-in-one" solution for maximising portability and usability of painting equipment, e.g. for hands-free painting.

BACKGROUND TO THE INVENTION

Painting, especially in an outdoor environment, presents a series of common problems to a user. Indeed, holding a paint palette is a juggling act with other necessary equipment (e.g. two water containers, paints, mixing areas, brushes, paper, etc.). It is a particular requirement that components associated with holding water and/or paint need to be level and stable at all times to avoid spilling. A user/painter only has two hands to hold and access all this equipment while painting.

Various compact and foldable palette devices exist; however, these tend to have small and shallow mixing areas and little or no consideration for appropriate amounts of clean water for painting. Magnetic couplings (e.g. within a closeable lid or to hold mixing wells in place) are also known, but not in connection with a convenient-to-release docking system between palette and a supporting mount.

SUMMARY OF THE INVENTION

The present invention is an evolution in the field of paint box and portable palette design, resulting in improved comfort while painting. The invention is a flexible system that is customisable according to user's personal preference, suitable for application in as many painting situations as possible. At the least the invention will provide the public with a useful alternative to available designs.

In a broad aspect implementing the invention a system is defined according to claim 1. A separable paint box is also described and defined herein.

In practice the invention comprises three primary elements, namely: a paint box configurable to a palette (optionally for handheld use), a mounting system (preferably utilising a magnetic connection) and optional peripheral items for attachment to the mounting system and/or palette.

In one form the mounting system consists of mating shaped parts (e.g. a protruding oval-like "stadium" part and receiving part of complimentary shape) having corresponding chamfered edges which couple together and are also separable by a twisting or sliding motion. The mating shapes are preferably non-circular but many variations are possible to achieve a naturally separating function from a twisting and/or sliding motion, assisted by the chamfered configuration. In the primary embodiment described herein one half of the mounting system is built into the floor of a paint box, however, in alternative forms a "floor-plate" may be provided that can be attached to a user's own preferred paint box design. In the context of the invention, a paint box or palette will typically have multiple paint wells moulded into it.

Internal magnets may be employed to result in a 'magnetic dock' (one half of the mating parts) onto which a paint box/palette (the other half of the mating parts) can be mounted. The mating parts, which in the exemplary embodiment are stadium-shaped, or equivalent, chamfered mating parts include a first curved section and a straight or second curve (different radius) to perform a cam function that assists in twisting to separate the mating parts. In other words, the chamfered edge and twisting motion lifts the paint box away from its dock and the magnets are not able to resist said lateral and naturally levered movement.

Additional features/components can be incorporated with the mounting/magnetic dock, e.g. a leg strap via loops on the underside of the dock; a 'pro-plate' via slot and ratchet mechanism; a small 'pro-plate' via slot and ratchet mechanism; a mating part for a common vehicle cup holder (for convenient location of a paint palette within a vehicle cabin environment) and/or a clipboard via slot and ratchet mechanism.

Peripheral items that are attachable include bottles (e.g. Nalgene containers) and camera mounting accessories such as clamps and tripods.

A variant of the palette box, with flexible add-on mounting system may be suitable for indoor and outdoor use but excels for use in the field e.g. urban sketching, plein air painting. The device is light and portable to take anywhere and the mounting system allows for hands-fee painting in almost any circumstances. The paint box can easily be released and re-attached to the magnetic mounting dock.

The container invention described herein has benefits over known prior art in that it has improved look and function. The improved functions include: hidden hinges (resulting in a more elegant external design) enabled by a twin wall, a magnetic lid closure (e.g. with hidden magnets enabled by twin wall), a plurality of latched, folding palettes which also serve as lids over a main compartment, these lids are latched to prevent wind gusts closing and spilling mix when open; a paint box pan tray i.e. removable for easy cleaning and exchanging colour schemes, with an elastomeric (e.g. silicone) lid that stretches over a hard plastic pan tray to form a cassette; the elastomeric lid keeps paints moist and prevents leakage when travelling; deep mixing wells and more mixing areas; soft removable (for easy cleaning) foot on underside to protect surfaces, e.g. table-top, and adds grip; flush, latchable thumb ring for providing a convenient holding feature by one hand of the user; UNC (unified course) thread (i.e. standard camera tripod bush such as ¼ inch (6.275 mm)) to directly mount paint palette box to conventional tripod-type mounting equipment; accessory slots in cavity wall to mount water containers and other accessories.

The paint box may be a twin wall (alternatively termed a cavity wall or box wall) design that is unique to paint boxes and allows for accessory mounting slots, holds lid closure magnets, results in improved/stronger walls, allows to moulding of 'hidden' hinges and in line of draw. Other variations may be 3D printed or milled from a block of material like aluminium. In these cases, the paint box may have comparable lid features as described herein, but not necessarily a cavity wall which allows for convenient injection moulding. Provision of at least one hidden hinge is still preferable in further variations.

Advantages of the (magnetic) mount system aspect of the invention include: metal plates can carry heavy water bottles (e.g. 125 mL, 250 mL, 500 mL) and allows an array of UNC threaded holes that may provide attachment points for peripheral equipment such as a tray for paintbrushes; quick release 'C' or 'E' clips to hold bottles securely; integrated plastic dock allows quick release and docking of palette box, i.e. achieved by use of strong magnets and positive and negative inverted stadium shape with chamfered edge.

Indeed, the unique design of a stadium shaped protrusion and chamfered geometry in combination with a twist release action allows for smooth and easy release of palette box from dock and avoids spilling of paint mix and water.

Furthermore, moulded strap loops and strap allows for leg mounting; sliding, notched motion of plastic dock on aluminium plate allows for better positioning of leg strap (ergonomics). The platform proposed by the invention also allows more mounting options with other mounting accessories and provides space to hold brushes, pens, etc. The magnetic mount is able to function with a variety of slot fit and ratchet adjustable metal plates, as well as working as a standalone product.

BRIEF DESCRIPTION OF THE DRAWINGS

FIG. 14 illustrates an end section view through the paint box palette, showing an internal hinge, whereas FIG. 16 illustrates a side section view through the paint box palette, showing both an internal and external hinge, whereas

DETAILED DESCRIPTION OF THE INVENTION

The following description presents an exemplary embodiment and, together with the drawings, serves to explain principles of the invention. However, the scope of the invention is not intended to be limited to the precise details of the embodiments or exact adherence with all features, since variations will be apparent to a skilled person and are deemed also to be covered by the description. Indeed, the present disclosure may separately define a number of discrete inventions. Terms for components used herein should be given a broad interpretation that also encompasses equivalent functions and features. In some cases, several alternative terms (synonyms) for structural features have been provided but such terms are not intended to be exhaustive.

Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. Directional terms such as "vertical", "horizontal", "up", "down", "upper" and "lower" are used for convenience of explanation usually with reference to the illustrations and are not intended to be ultimately limiting if an equivalent function can be achieved with an alternative dimension and/or direction.

The description herein refers to embodiments with particular combinations of steps or features, however, it is envisaged that further combinations and cross-combinations of compatible steps or features between embodiments will be possible. Indeed, isolated features may function independently as an invention from other features and not necessarily require implementation as a complete combination.

Figure 1:
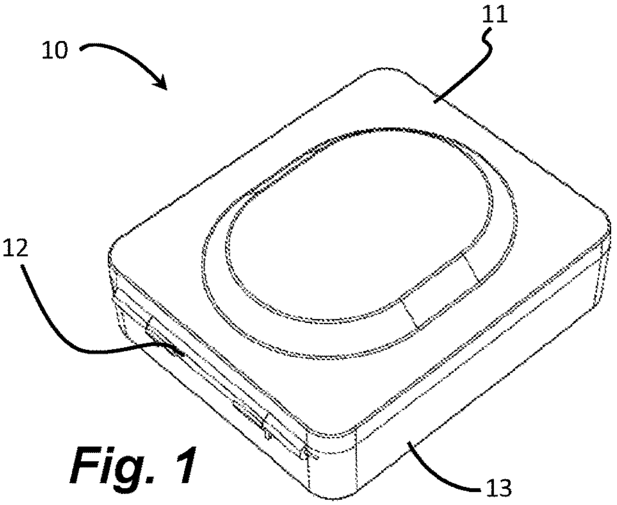
FIG. 1 illustrates an overview of a paint box according to one aspect.
Figure 2:
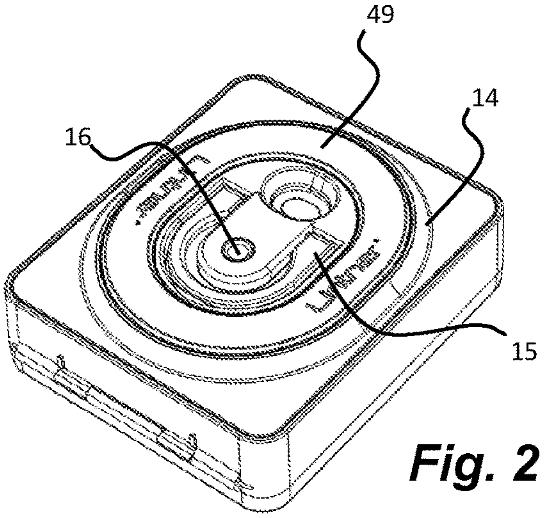
FIG. 2 illustrates an underneath view of the paint box.

FIGS. 1 and 2 provide a perspective top and bottom view respectively of a paint box 10, configurable when opened (see FIG. 3) into a palette for use. The main features visible in the closed box 10 include a first lid 11 that is hinged (12) from a sidewall 13 and, on the underside, a coupling feature 14 for mating with a mounting system (described in further detail below) and deployable thumb/finger ring 15. When used as a standalone unit, the thumb ring 15 of paint box 10 is lifted, via a hinge, to provide a holding point, i.e. by sliding a user's thumb or finger through it and supporting the base on box 10 on the palm of a hand or fingertips. A rubber foot 49, which conforms to the stadium shape of the chamfered coupling feature, provides a non-slip surface.

FIG. 2 also shows a threaded opening 16 on the underside into which may be screwed a UNC mounting, e.g. a tripod camera mount or the like.

Figure 3:
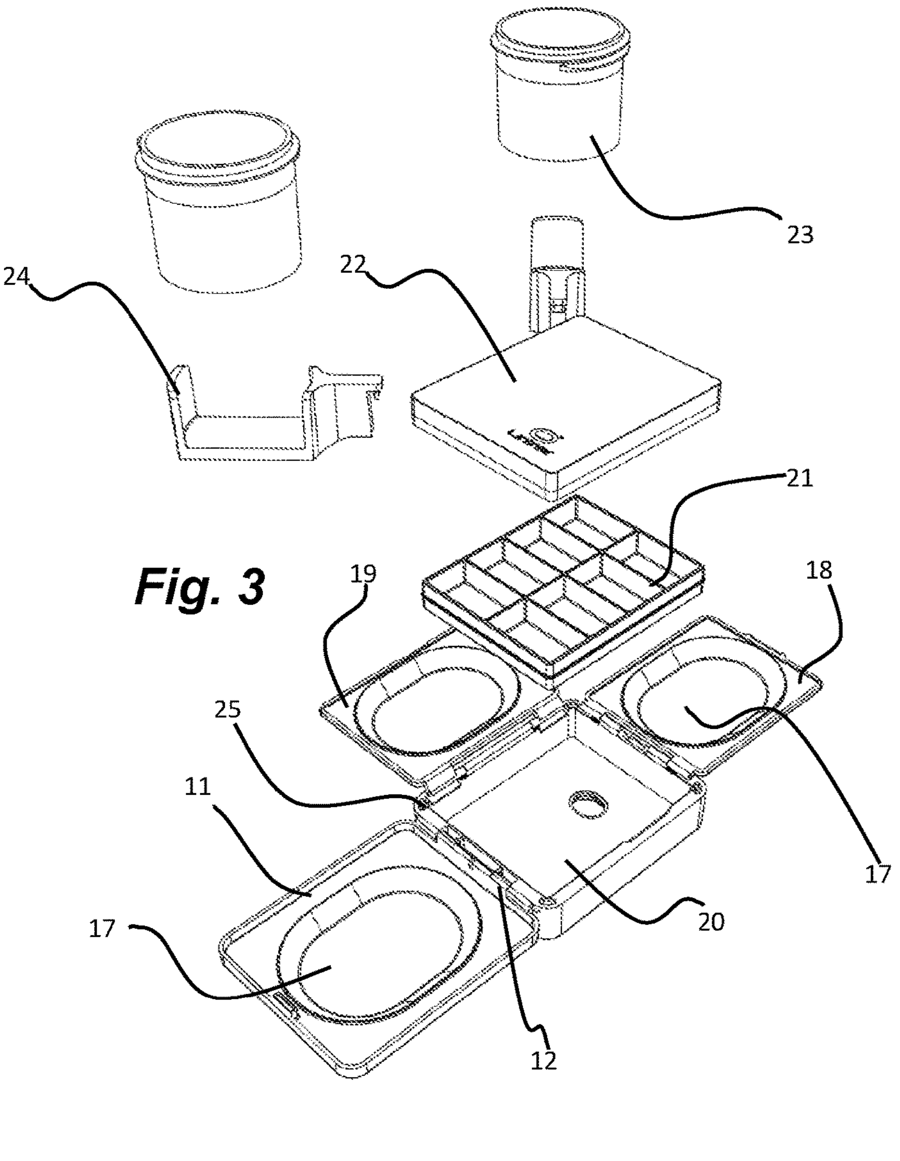
FIG. 3 illustrates an exploded overview of components associated with the paint box.

FIG. 3 shows an open configuration. Particularly, lid 11 has been displaced 180 degrees about external hinge 12 to a fully opened position where a stadium-shaped recess 17 is accessible that serves as a mixing area. Preferably the lid/palette 11 is latched open by virtue of the hinge design in order to resist against unintentional closing, e.g. by a gust of wind. Lid 11 is closable again by manually overcoming a latch force of the hinge.

The "stadium" shape is an aesthetic choice for recess 17, in keeping with other features of the invention that have more functional uses, to be described hereinbelow.

Two additional internally hinged (and latchable) lids 18 and 19 are shown in an open position, which become accessible after opening of first lid 11. The lids unfold, like flower petals, from closed positions where they had formed a three-layered closure over a main compartment 20 which houses a multi-compartment paint tray/cassette 21 having a lid 22 (e.g. of silicon). Details of the internal hinges, made possible by the cavity wall design, are described hereinbelow with reference to FIGS. 13, 14 and 16.

Optional peripheral components, such as water containers 23, may be mounted into support brackets 24, extending from a corner mount point 25. The corner mount points 25 (e.g. at all corners) may be an opening through wall 13 (which may be hollow) for receiving a protruding element of bracket 24 by an interference fit or slide fitting hook.

Figure 10:
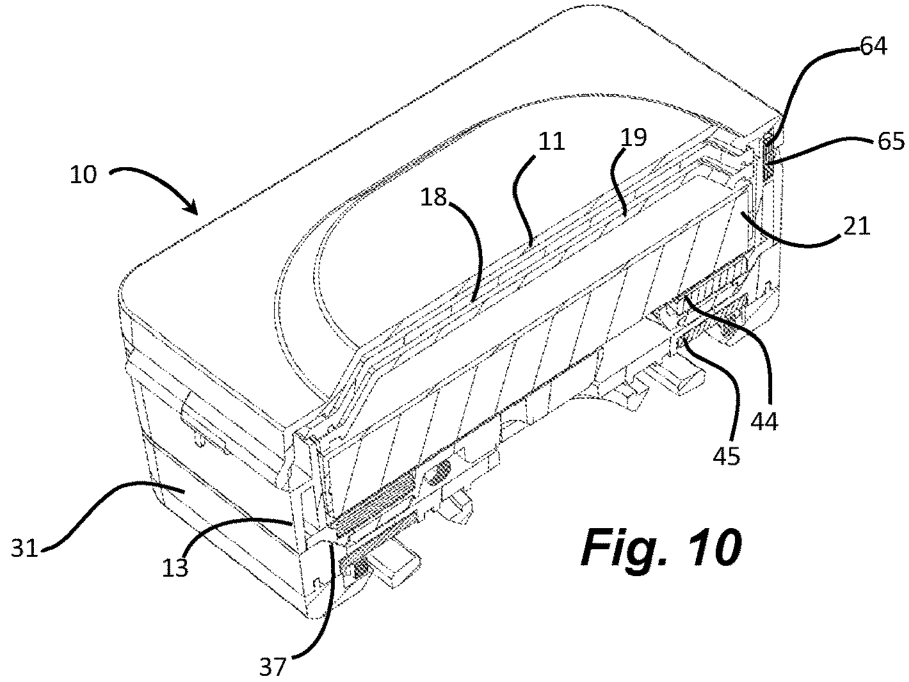
FIG. 10 illustrates a section view through the paint box palette and mounting system.

In its fully deployed and assembled configuration paint box 10 resembles a palette having three or more mixing areas 17 and up to four water containers 23. After use, lids 18, 19 and 11 can be closed in sequence to close compartment 20 and enclose tray 21. The lids may be secured closed by suitable means, preferably a magnetic connection, e.g. complimentary magnetic material embedded in a lid edge and side wall respectively, e.g. magnet pair 64, 65 as seen in FIG. 10.

Figure 4:
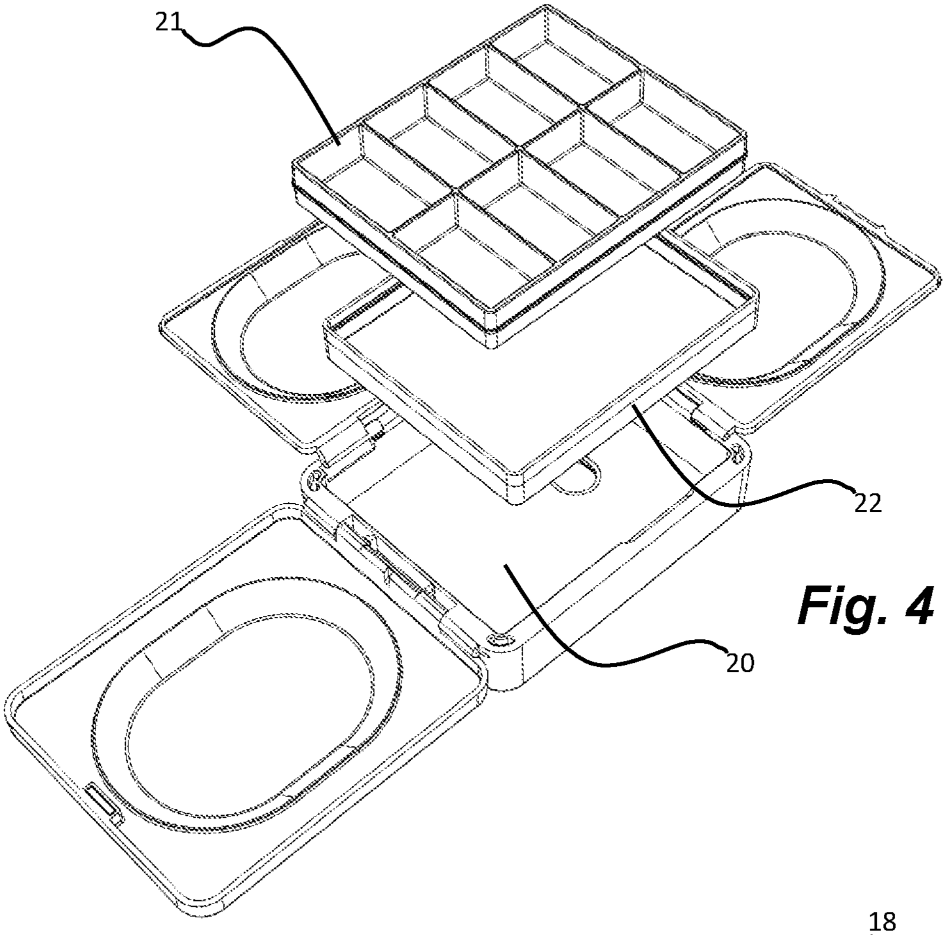
FIG. 4 illustrates an alternative exploded view.

FIG. 4 shows a variation of FIG. 3 where tray lid 22 has been moved to a stowed position underneath tray 21. Being elastomeric, lid 22 stretches around the base of tray 21 and both parts may be accommodated in main compartment 20 during use of the palette configuration for painting.

Figure 5:
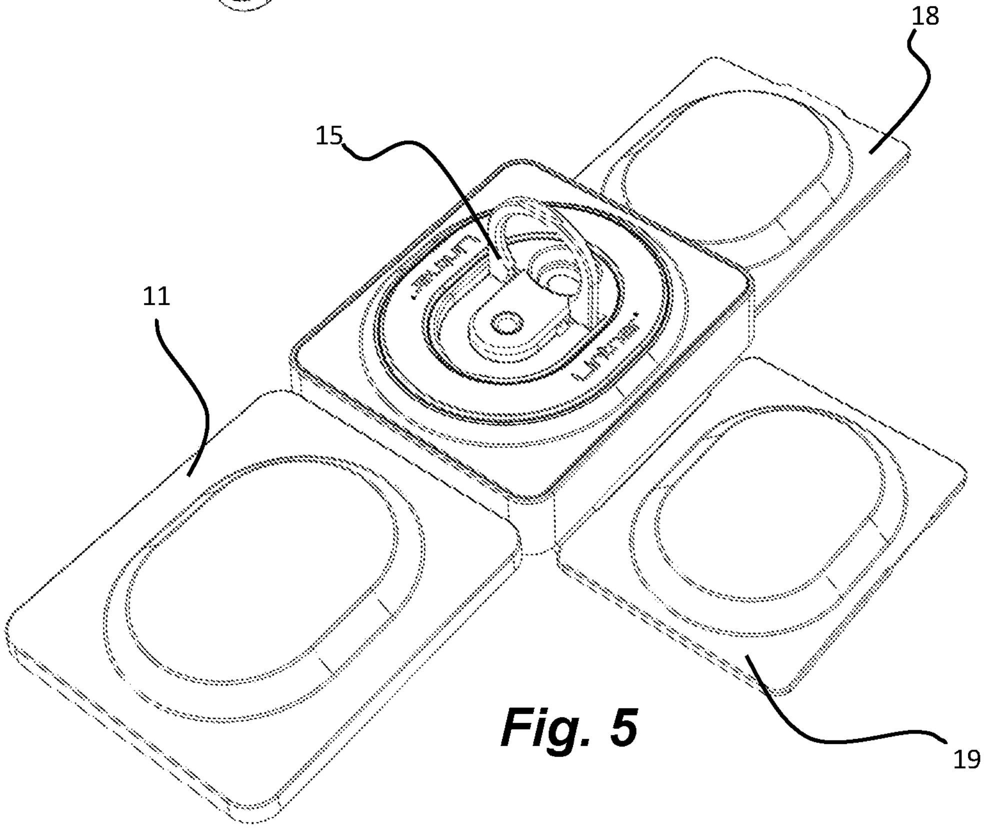
FIG. 5 illustrates an underneath view where a thumb-holding ring is shown in upstanding position.

FIG. 5 shows the underside of the device in open palette mode where lids 11, 18 and 19 are deployed, as is thumb ring 15 in an upstanding position.

Figure 6:
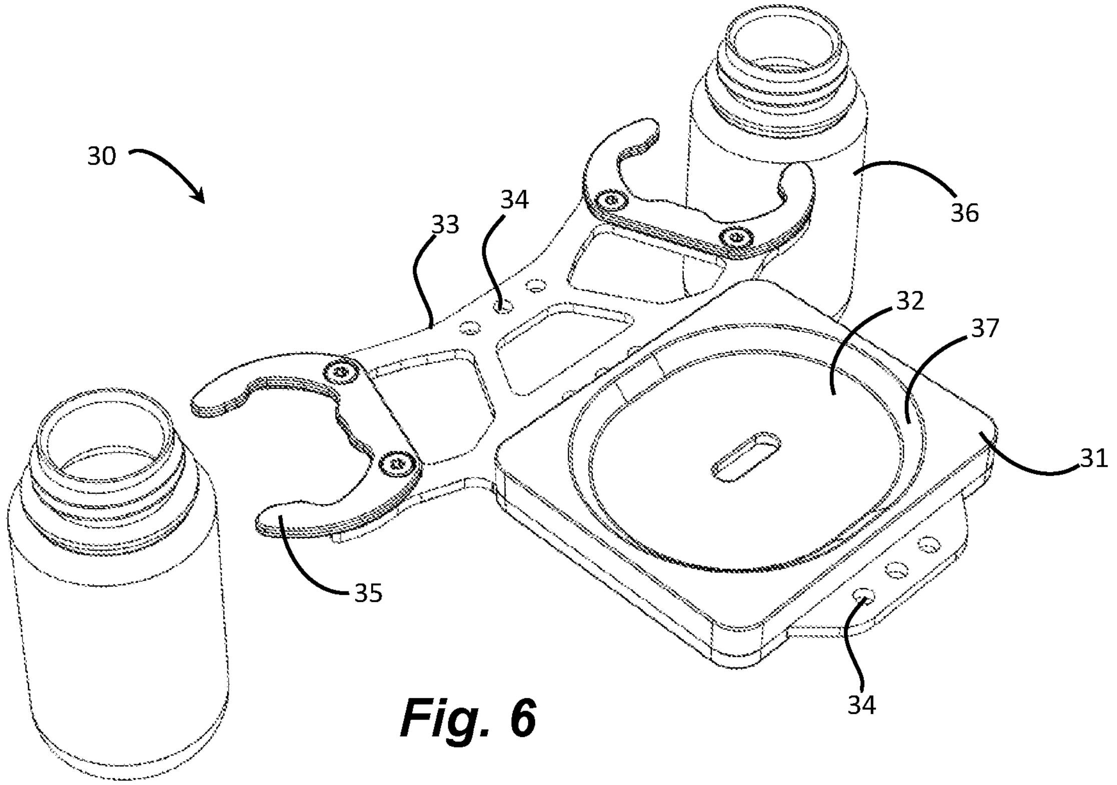
FIG. 6 illustrates an overview of a mounting system for a paint palette/box according to the invention.

FIG. 6 illustrates a mounting system 30 for receiving a paint box as shown in FIGS. 1 to 5. The mounting system primarily comprises a dock portion 31 having a stadium-shaped recess 32 for receiving the like-shaped coupling feature 14 on the underside of paint box 10.

Dock 31 may be, in turn, mounted from or incorporated with a frame 33 that includes multiple fixture points (e.g. openings 34 that may couple to a tripod mount or the like with UNC threads) and clips 35 that support one or more water containers 36. Clips 35 and containers 36 are generally intended to be alternative to and larger/more robust than containers 23 and brackets 24 but may be used in combination therewith.

The paint box 10 is preferably connected to mounting dock 31 by a magnetic means. A stadium-shape recess 32 and corresponding paint box coupling part 14 is chosen such that the magnetic connection can be broken by twisting or sliding the relative parts, aided by a chamfered edge 37. Alternative constructions are possible, preferably achieving an equivalent function, i.e. a curved leading to straight or other curved shape with chamfered edges that enable two mating parts to couple and de-couple by a twisting or sliding motion.

Figure 7:
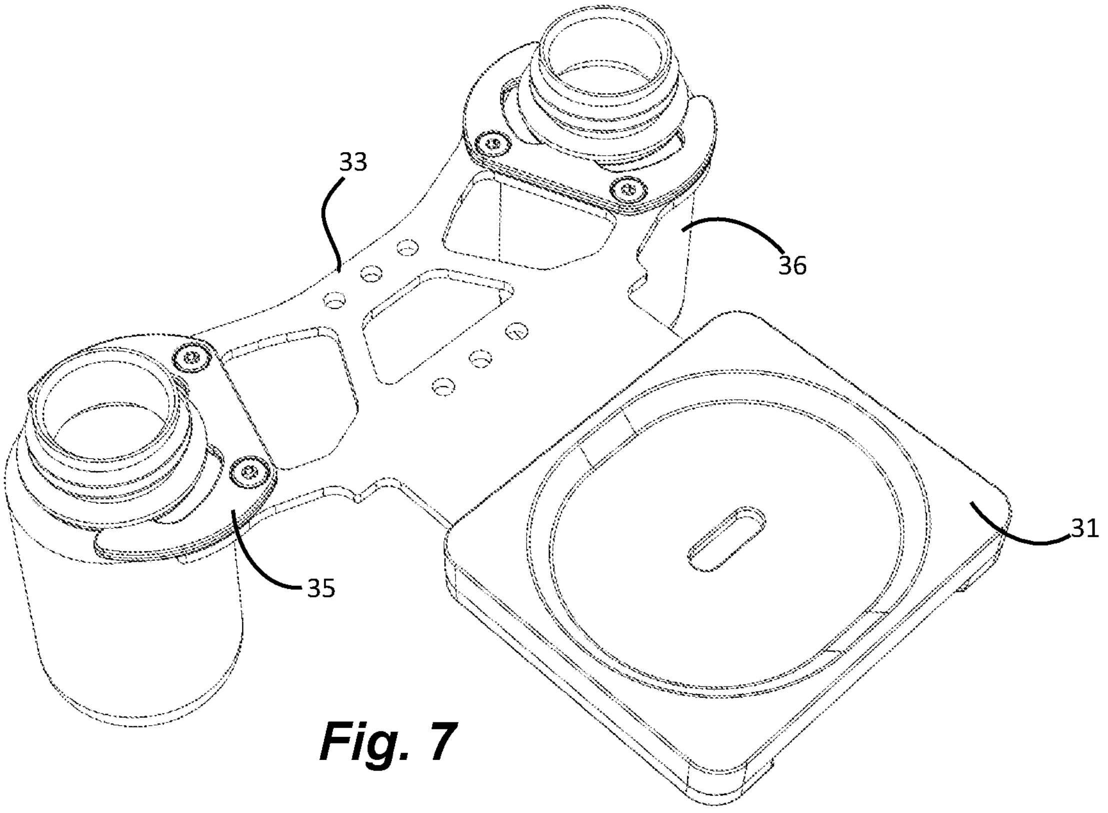
FIG. 7 illustrates an alternative view of the embodiment shown in FIG. 6.

FIG. 7 illustrates a view of the invention where bottles 36 are in place within E-clips 35 and mounting dock 31 is in an extended position upon frame 33, i.e. moved away from clips 35.

Figure 8:
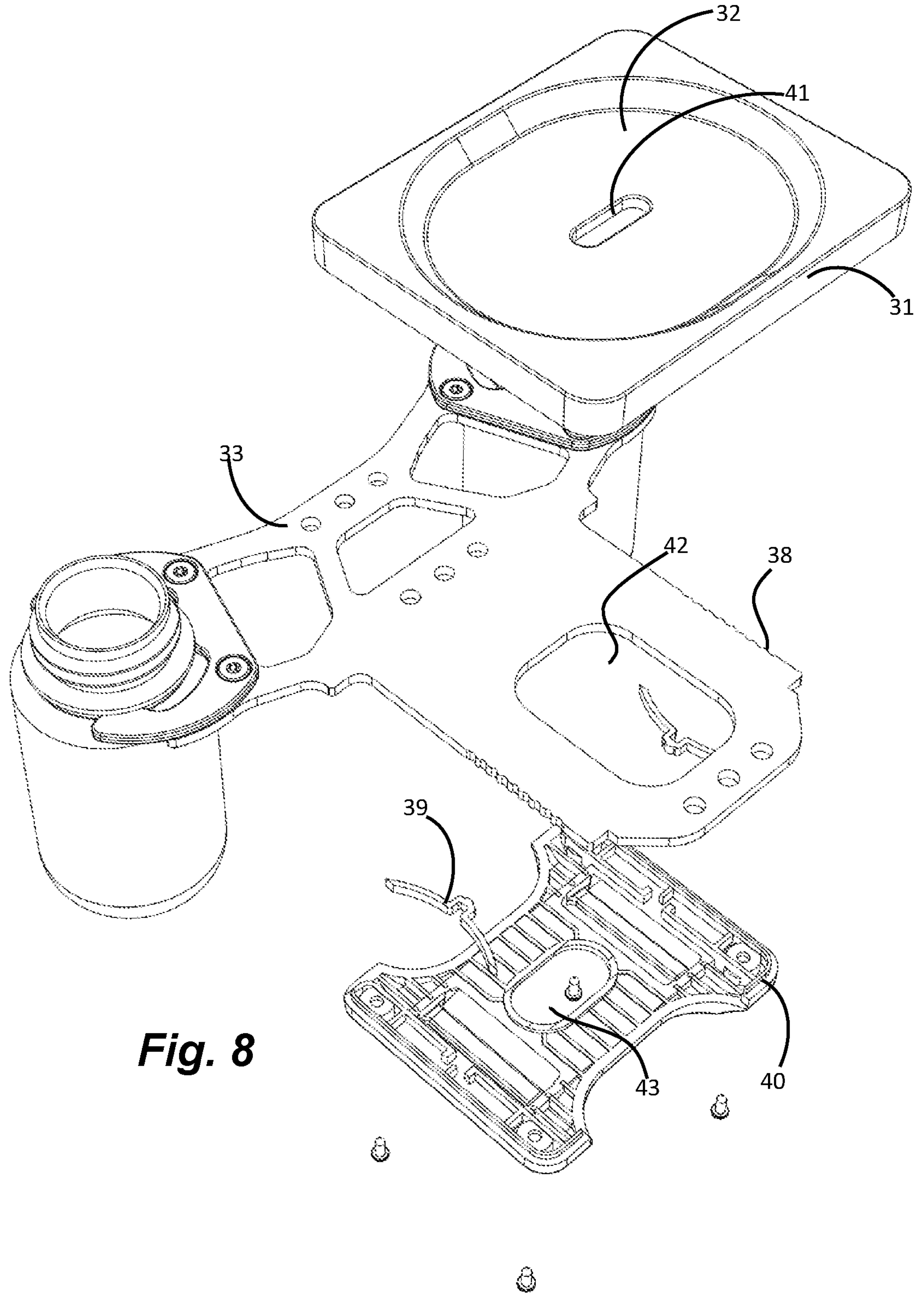
FIG. 8 illustrates an exploded view of components associated with the mounting system.

FIG. 8 illustrates an exploded view of dock components where a ratchet mechanism, toothed edge 38 of frame 33 and resilient leaf springs 39, is visible. This mechanism enables a sliding extension of dock 31 upon frame 33 as described above, thereby extending the working length. Leaf springs are accommodated by a lower moulding 40 that, together with upper part 31, comprises the slidably adjustable mounting dock.

A through-slot 41, centrally located within recess 32, provides access to any fixture points underneath paint box 10, e.g. UNC connection 16, for the purpose of locking the mounting dock 31 and box 10 together, overriding potential disengagement of the magnetic connection. It will be apparent that frame 33 includes an opening 42, as does lower moulding 40 (opening 43) that allows underside access to slot 41 and connection 16.

Figure 9:
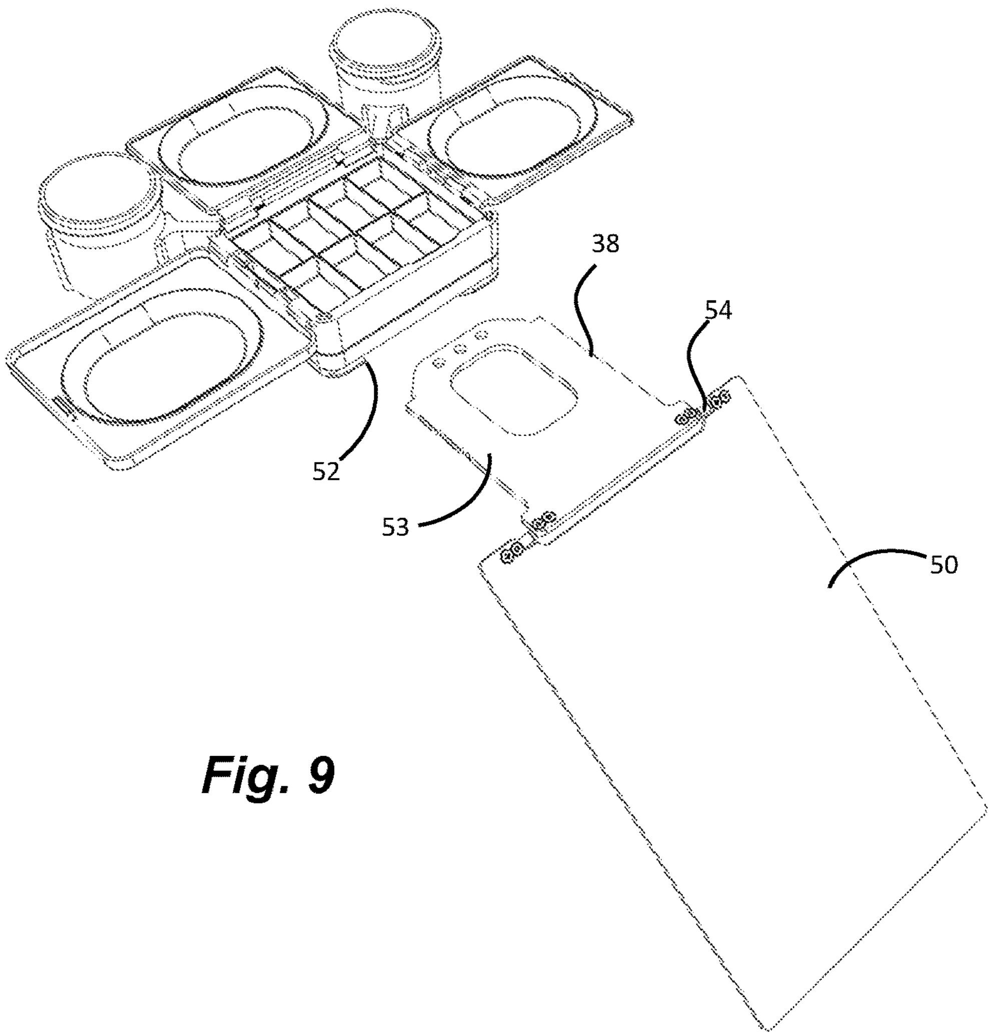
FIG. 9 illustrates an alternative exploded view where a clipboard component is provided for interfacing with the mounting system.

FIG. 9 illustrates a variation where a clipboard 50 attachment, having a corresponding toothed (38) frame 53 may slide into a channel 52 in mounting dock 31 and engage with ratchet springs 39. Clipboard 50/frame 53 takes the place of frame 33 as pictured in FIGS. 6 to 8. Preferably clipboard 50 includes a friction hinged connection 54 with frame 53 enabling both parts to fold flat for transport and to adjust a relative angle and fix that angle when in use, by virtue of inherent friction within the hinge. The hinge friction force should be such that a loaded palette can be supported in an angled position relative to the clipboard. The clipboard being typically handheld by a user, e.g. against a seated leg, for sketching.

FIG. 10 shows a cross-section perspective view of paint box 10, in closed configuration, mounted in place upon dock 31. The lid layers 11, 18, 19, paint cassette 21, box-section side wall 13, corresponding internal magnets 44, 45 and chamfered mating edges 37 are visible.

Figure 11:
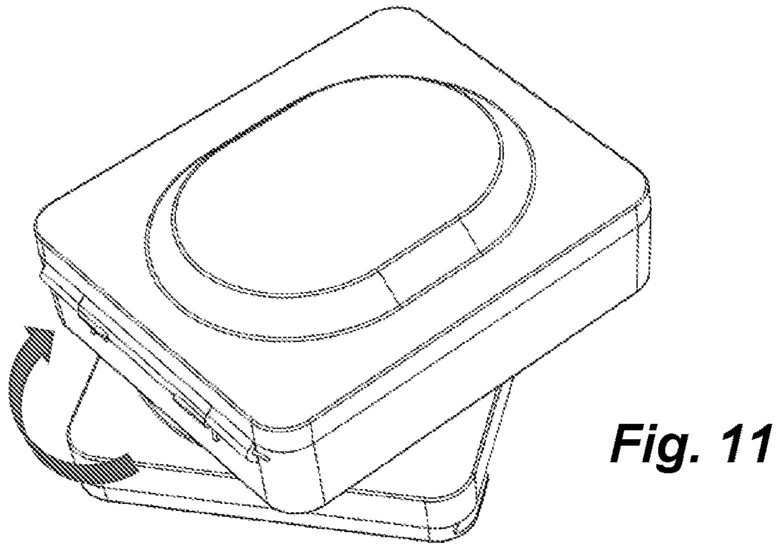
FIG. 11 illustrates an overview of the system during coupling/de-coupling.
Figure 12:
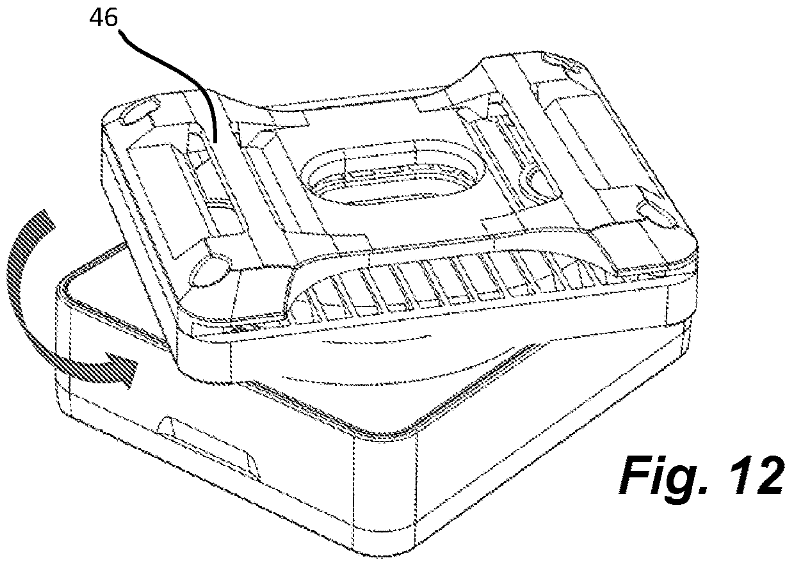
FIG. 12 illustrates an underneath view of the system during coupling/de-coupling

FIGS. 11 and 12 show top and bottom views respectively of box 10 as it de-couples with dock 31. Specifically, a manually operated twisting and/or sliding motion enables the cam action of 45-degree chamfered edge 37 to prise magnets 44 and 45 apart and achieve disengagement. Paint box's floor can then be lifted/pulled away from dock 31. A reverse operation, or simple placement onto the receiving plate, may re-engage magnets 44/45.

The underneath view of FIG. 12 also shows a pair of slotted through-openings, defined by bridge pieces 46, for receiving a strap means. For example, a belt-type strap may encircle a user's thigh or other body part in order to secure the mounting dock and provide an anchor point for the paint box, especially in a sitting position. The mounting dock/box may alternatively be secured to any available mechanical substrate, such as the arm of a chair.

Figure 13:
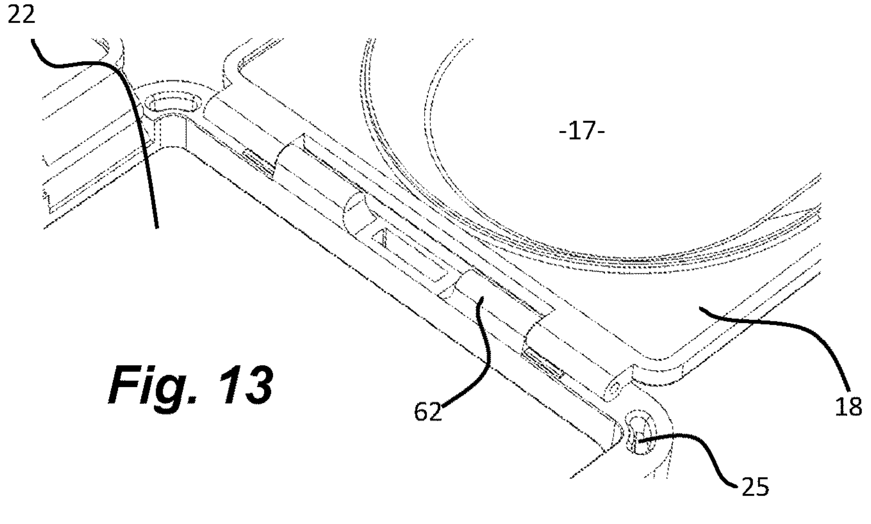
FIG. 13 illustrates a close-up view of an internal hinge of the paint box palette.
Figure 14:
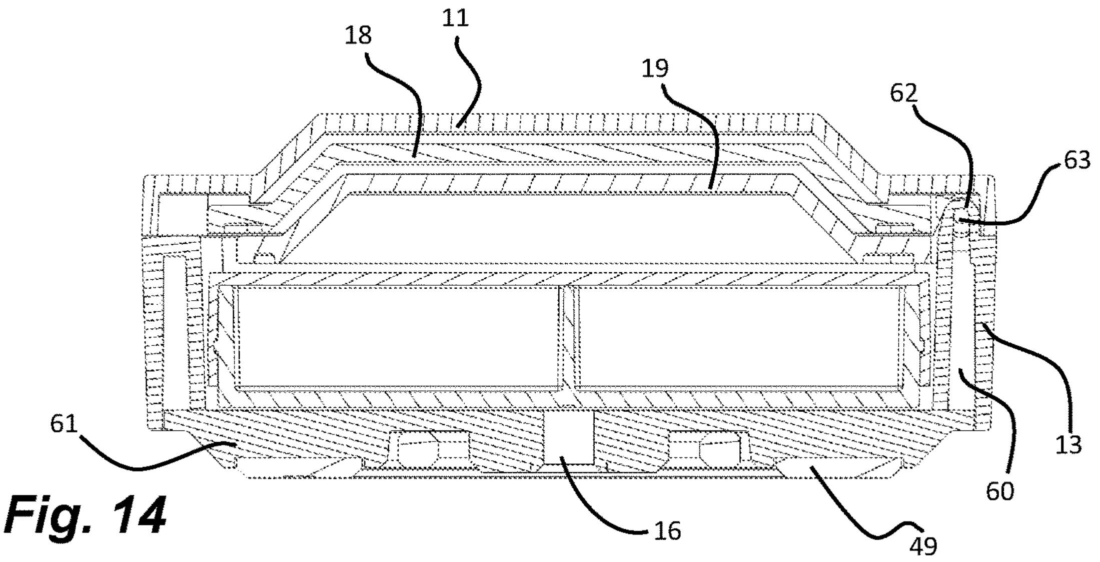
Figure 15:
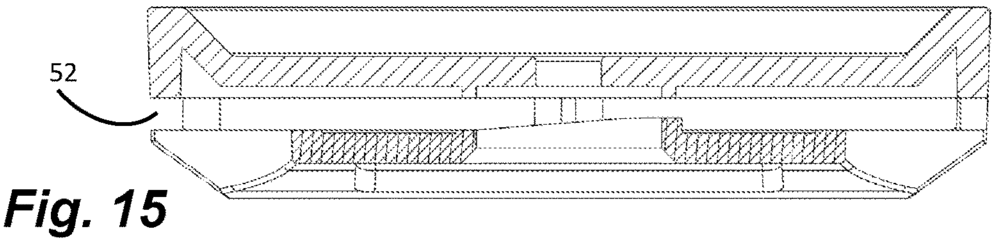
FIG. 15 shows a corresponding view through the mounting system.
Figure 16:
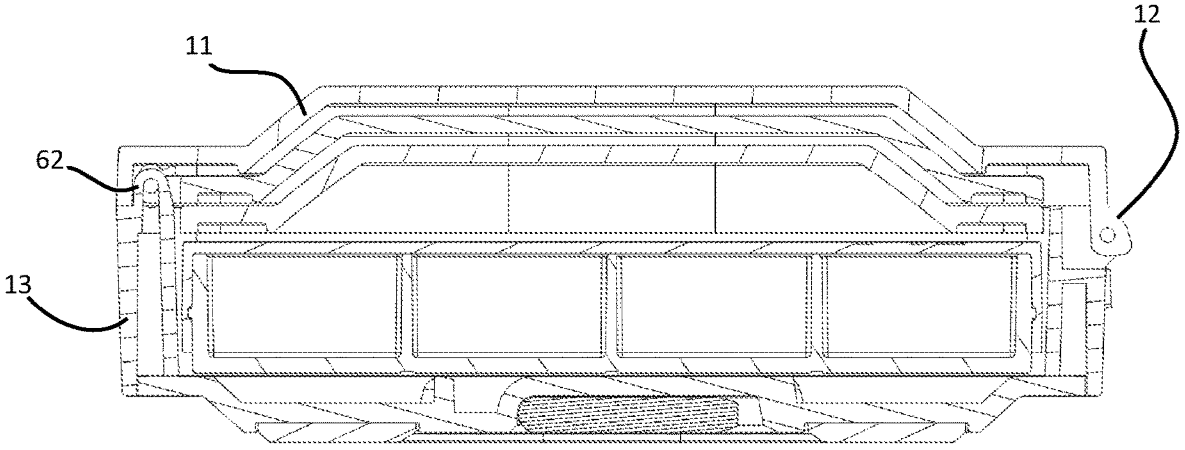
Figure 17:
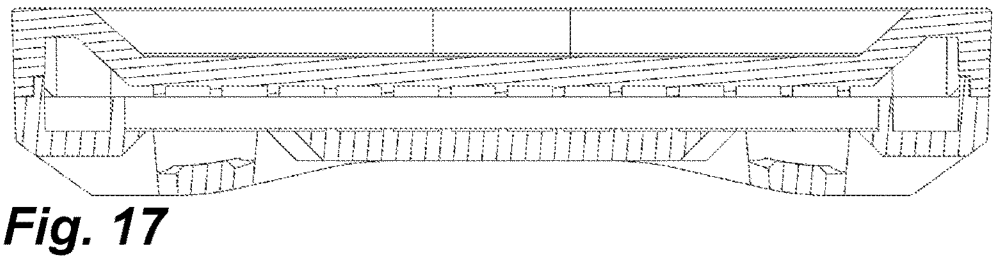
FIG. 17 shows a corresponding view through the mounting system.

FIGS. 13, 14 and 16 illustrate particular features of a cavity wall design incorporated with the side walls of paint box 10, that enable an internal hinge to be constructed, although it is noteworthy that these features may be applied to other container types with hinged lids.

With reference to FIGS. 14 and 16 side wall 13 can be seen to be hollow, i.e. having a cavity 60. The side walls are preferably moulded in one piece and a separate floor 61, incorporating coupling features for the mounting system (e.g. chamfered edge, threaded opening 16) is applied to close off cavity 60.

Floor 61 is preferably welded onto the open end of wall 13, over cavity 60. Floor 61 may be provided as a separate component, for use with the mounting system, that has a sufficient thickness to accommodate a screw thread 16, flush latchable finger ring and removable foot 49. The outward surface of floor 61 is flat/flush so that it can stably rest upon a flat surface such as a desk.

At an upper edge of cavity wall 13 there is space for moulding of a hinge 62 (bridging cavity 60) that will receive a pin 63 for hingedly attaching one of the internal lids (19). Hinge 62 is "internal" in that it is completely covered over and hidden by outermost lid 11 when the paint box is in a fully closed state.

FIG. 16 shows both an internal hinge 62 at the top of cavity wall 13 and external hinge 12 that enables opening and closing of lid 11. Magnets for enabling lids to be latched closed may also be hidden within cavity walls 13.

The overall aesthetic appearance of the box is greatly improved by the functional structure of cavity wall design 60. Box 10 (see FIG. 1) has one externally visible hinge 12 but has otherwise smooth surfaces about its peripheral edges, hiding foldable panels that extend to provide two or more palettes for mixing paints.

It will be apparent that numerous variations are possible within the scope of invention envisaged by the present disclosure. For example: paint box 10 may include a recessed/female coupling part, while mounting dock 31 is associated with a male coupling part; a hand/finger support ring may be integrated into the underside of dock 31 in addition to or instead of box 10; a fourth lid may be incorporated; multiple mixing areas may be incorporated as recessed zones in a lid. Furthermore, the floor (that incorporates coupling features) of box 10 may be a separable or separately sold element for coupling to another brand or preference of paint box design, depending on user requirements.

By way of summary, in one form the invention can be described as a paint palette mounting system comprising a docking portion and a paint box, re-configurable to become a paint palette. The system includes a first half of a coupling feature at the docking portion for coupling with a second half of the coupling feature located on the paint box/palette. The coupling feature is preferably comprised of complimentary stadium-shaped parts, with chamfered edges, that are separable by a twisting or sliding motion. The parts are held together in use by magnetic connections and/or a mechanical fixing element. The paint box/palette includes several overlapping lids that unfold to provide paint mixing surfaces.

It is noteworthy that:

The shape of dock does not have to be stadium-shaped, but can be any shape (preferably excluding a circle). A chamfered edge allowing decoupling is, however, important.

To release the two docking portions a lateral motion is needed. This can be a twisting motion, but also a sliding motion or other.

Features on the underside of box (or a plate for attachment to a box):

Elastomeric removable foot

Hole to remove/lift cassette

UNC thread

The invention is in essence a highly configurable and hands-free portable paint box/palette. A step-change in the field of portable/outdoor painting. Particularly:

It is suitable for large painting (which require lots of water and therefore needs large water bottles; metal frame can hold the heavy water, optionally used in conjunction with an easel).

Is equally suitable for small paintings/sketching (when used with small water bottles and corner brackets, and i.e. dock and knee strap)

Or any other size of painting.

Allows for different body positions (ergonomics) of user.

Standing (e.g. urban sketching, where user holds all equipment, e.g with use of the clipboard attachment).

Standing (e.g. landscape painting i.e. with easel, where user holds only a paint brush)

Sitting: e.g. various chairs, stools, urban stairs, ground etc.

Various water container sizes combined with various mounting options are key to providing the user/artist with maximum flexibility and comfort for all painting situations.

In a broad aspect there is described herein: a container, comprising: a main compartment bounded by a cavity wall, the cavity wall including an inner hinge at at least one edge thereof; an inner lid, pivotally attached to the cavity wall at the inner hinge; an outer lid that, in a closed state, overlaps with the inner lid and covers the inner hinge.

The container may comprise a deployable ring portion, extendable from a flush latched position an underside of the main compartment, for holding by a user. In one form, each of the inner and outer lids may be openable in different directions from the main compartment. In one form, a latch means to hold the lids open against unintentional closing. At least one lid may comprise a magnetic closure element. The container may include a second half of a coupling feature, for docking with a first half of the coupling feature located on the docking portion of a mounting system. In which case, the second half of the coupling feature may include a chamfered surface.

A surface of the container may comprises a secondary coupling feature; e.g. selected from, alone or in combination: a strap receiving means, a threaded fixing element or opening therefor, a cup holder engagement part.

The container may comprise mounting positions, formed into an edge of the cavity wall, for removable brackets. In further forms, the container may be provided in combination with a paint tray, the paint tray including a lid, e.g. of elastomeric material, that can be removed and stowed underneath the paint tray when in position in the main compartment.

The mounting system described herein may be provided in combination with the container outlined above.

The invention claimed is:

1. A mounting system for a paint palette housing a multi-compartment paint tray, the mounting system comprising:

a docking portion including a first half of a coupling feature, for docking with a second half of the coupling feature located on a paint palette, the coupling feature including mating chamfered edges carried on the docking portion and on the paint palette;

wherein a shape of the first half of the coupling feature is configured for coupling with the like-shaped second half of the coupling feature, a magnetic connection operative between the first half and the second half of the coupling feature, the first and second halves of the coupling feature being configured such that a twisting and lifting motion of the mating chamfered edges of the docking portion relative to the paint palette will cause separation and breaking of the magnetic connection between the first half and the second half of the coupling feature.

2. The mounting system of claim 1, wherein the shape of the first half of the coupling feature is a stadium-shape.

3. The mounting system of-claim 1, wherein a surface of the docking portion comprises a secondary coupling feature.

4. The mounting system of claim 3, wherein the secondary coupling feature is selected from, alone or in combination: a strap receiver, a threaded fixing element or opening therefor, a cup holder engagement part.

5. The mounting system of-claim 1, further comprising a frame portion.

6. The mounting system of claim 5, wherein the docking portion is slidably mounted on the frame portion.

7. The mounting system of claim 6, wherein slidable mounting is enabled by a ratchet mechanism between docking portion and frame portion.

8. The mounting system of-claim 5, wherein a clip board extends via a friction hinge from the frame portion.

9. The mounting system of-claim 1, further comprising clip-mounting positions for removable containers.

10. The mounting system of-claim 1, including an opening through the docking portion for accessing a fixing point on the paint palette.

11. The mounting system of claim 1, further including a mounting plate for attachment to a paint palette, the mounting plate comprising the second half of the coupling feature.

12. A combination mounting system and container, the combination comprising:

a mounting system comprising a docking portion including a first half of a coupling feature, for docking with a second half of the coupling feature located on a paint palette, the coupling feature including mating chamfered edges carried on the docking portion and on the paint palette, a shape of the first half of the coupling feature is configured for coupling with the like-shaped second half of the coupling feature, a magnetic connection operative between the first half and the second half of the coupling feature, the first and second halves of the coupling feature being configured such that a twisting and lifting motion of the mating chamfered edges of the docking portion relative to the paint palette will cause separation and breaking of the magnetic connection between the first half and the second half of the coupling feature;

a container comprising a main compartment bounded by a cavity wall, the cavity wall including an inner hinge at at least one edge thereof;

an inner lid, pivotally attached to the cavity wall at the inner hinge; an outer lid that, in a closed state, overlaps with the inner lid and covers the inner hinge.

13. The combination of claim 12, wherein the container comprises a deployable ring portion, extendable from a flush latched position an underside of the main compartment, for holding by a user.

14. The combination of claim 12, wherein each of the inner and outer lids are openable in different directions from the main compartment.

15. The combination of claim 12, wherein the container comprises the second half of the coupling feature, for docking with the first half of the coupling feature located on the docking portion of the mounting system.

16. The combination of claim 12, wherein the container comprises a paint tray with a plurality of wells moulded thereinto, the paint tray including a lid that can be removed and stowed underneath the paint tray when in position in the main compartment.

17. The combination of claim 16, wherein the lid is elastomeric.

* * * * *